(12) United States Patent
Desjardins (10) Patent No.: US 8,112,948 B2
(45) Date of Patent: Feb. 14, 2012

(54) SEALING STRUCTURE FOR A LOADING DOCK OPENING

(75) Inventor: Roger Desjardins, Grand Falls (CA)

(73) Assignee: R.D. Enterprises, Inc., Grand Falls, NB (CA)

( * ) Notice: Subject to any disclaimer, the term of this patent is extended or adjusted under 35 U.S.C. 154(b) by 474 days.

(21) Appl. No.: 12/114,739

(22) Filed: May 2, 2008

(65) Prior Publication Data

US 2008/0302029 A1 Dec. 11, 2008

Related U.S. Application Data

(60) Provisional application No. 60/924,210, filed on May 3, 2007.

(51) Int. Cl.
*E04B 1/66* (2006.01)
(52) U.S. Cl. ...................................................... 52/173.2
(58) Field of Classification Search .......... 52/173.2; 49/504, 505, 484.1, 498.1
See application file for complete search history.

(56) References Cited

U.S. PATENT DOCUMENTS

| | | | |
|---|---|---|---|
| 3,391,503 A * | 7/1968 | O'Neal | 52/2.13 |
| 4,322,923 A * | 4/1982 | O'Neal | 52/173.2 |
| 4,750,299 A * | 6/1988 | Frommelt et al. | 52/173.2 |
| 5,007,211 A * | 4/1991 | Ouellet | 52/173.2 |
| 5,109,639 A * | 5/1992 | Moore | 52/173.2 |
| 5,675,945 A * | 10/1997 | Giuliani et al. | 52/173.2 |
| 6,170,204 B1 * | 1/2001 | Strobel et al. | 52/173.2 |
| 6,374,554 B1 * | 4/2002 | Eungard | 52/173.2 |
| 2004/0134139 A1 * | 7/2004 | Busch et al. | 52/173.2 |

* cited by examiner

*Primary Examiner* — Michael Safavi
(74) *Attorney, Agent, or Firm* — Timothy D. Bennett; Emerson, Thomson Bennett (57) ABSTRACT

The present invention provides a sealing structure for a loading dock opening, consisting of two flexible side seals on opposite sides with a sealing form and mounted in a vertical orientation to a frame, and a curtain-like head seal also affixed to the frame, which is affixed to the loading dock walls. Taken together, the sealing structure sealingly engages the cargo body such that weather elements do not enter the warehouse or truck body but goods can be moved between the cargo body and the warehouse. The seal is deformable but resilient, forming a seal when in contact with the truck cargo body, which has shape memory and stiffness to revert to its original form when it no longer contacts the truck cargo body.

The present invention also provides in one embodiment of the present invention, side seals mounted in a vertical orientation on each side of the loading dock entrance, an outer layer forming a sealing shape, typically that of a teardrop, in profile. It may contain one or more reinforcing strips within it, as well as a foam core, both of which help it to maintain its teardrop shape, even after frequent contact with a truck cargo body. The side of the side seal opposite the rounded portion of the teardrop comes together, forming a mounting flange, which is mounted by means of bolts to a metal frame, which in turn is mounted to the loading dock wall.

10 Claims, 14 Drawing Sheets

SEALING STRUCTURE FOR A LOADING DOCK OPENING

BACKGROUND OF THE INVENTION

1. Field of the Invention

The invention relates generally to sealing structures for applications to the periphery of a door or like opening and more specifically to heavy duty sealing structures for loading dock shelters that form an environmental seal between the warehouse interior and the exterior environment.

2. Background of the Invention

Loading docks contain doors that allow access from the exterior to the interior of a warehouse or other storage facility, and are used for loading and unloading cargo from freight trucks. Trucks reverse against the loading dock, and the sides and top may contain sealing structures which attempt to seal the cargo body of the truck such that the elements do not enter the warehouse and goods can then be moved between the cargo body and the warehouse. The seals attempt to prevent snow and rain from entering, but also attempt to reduce air exchange, for instance cold outside air from entering a heated warehouse, as well as preventing uncomfortable drafts.

Sealing structures of the above-mentioned general type are known in the art. Dock shelters consist of a framework that extends up to three feet out from the loading dock wall, and curtains may hang from this frame to drape over the top and either side of the docked cargo body. However, these curtains tend to be limp and may create a poor appearance. While acceptable in milder climates, they may not seal optimally in a windy or cold environment. Other arrangements include foam pads to which the cargo bodies are backed, and which seal as a result of compression of the foam. While these provide a seal, they are not ideal because the foam is prone to wear from contact with the cargo bodies and cargo doors. Additionally, foam seals may be more expensive than traditional dock shelters, and may reduce the access area of the trailer because the foam pads overlap the perimeter of the cargo body.

A further arrangement is shown in U.S. Pat. No. 4,359,846 which has three flexible sealing elements along the top and sides of the loading dock entrance, which are movable from an inoperative position flush with the loading dock entrance, to an operative position which attempts to seal the loading dock entrance into the truck cargo body. This configuration requires effort to extend the sealing lamellas into the cargo body which is not practical and causes further delay in the loading or unloading of a cargo body. As well, the seal is maintained by the use of springs which hold the lamellas in contact with the truck body, which are subject to mechanical breakdown and increased cost of manufacture.

It is also known to subdivide the flexible walls into several individual lamellas which are arranged parallel to one another, in order to provide improved matching of the walls to the outer contour of the container, such as is described in U.S. Pat. No. 5,333,424. The lamellas in this configuration are prone to abuse by the truck cargo bodies which reverse against them as several lamellas are held in a compressed state over the entire period of use. Furthermore, the lamellas are also prone to tearing with the uneven edges of the cargo body or the cargo doors, which fold around the side of the cargo body when fully open.

U.S. Pat. No. 3,854,257 discloses a sealing structure which is composed, on each side of the loading dock, of two sheets of flexible material, the front sides being joined together face to face, secured at one side, with the opposite sides bent backwards and secured to the loading dock to create a bumper that compresses when the truck contacts it. This design has shortcomings in that it uses two pieces to form the seal, making it mechanically complex and expensive to manufacture, and the inner joint is subject to wear leading to breakdowns. Similar disadvantages as outline above are present in this application as seals are maintained in a compressed state during any use which leads to the seals deteriorating quickly.

A further arrangement is disclosed in U.S. Pat. No. 6,948,285, wherein a dock shelter is described with face panels on both sides and on top, which are moveable for sealing against vehicles of various sizes. This arrangement is more durable than foam, but due to the use of springs it is mechanically complex, therefore less robust as well as expensive to manufacture.

Based on the above, there is a need for a sealing structure that will sealingly engage with a container regardless of the openings of the container to unload and load cargo. The present invention provides a sealing structure which allows the container to be environmentally sealed to the area of loading or unloading within a building, and addresses the shortcomings identified in the prior art by being less expensive to manufacture, more durable and a having a greater service life. The sealing structure of the present invention also does not require the use of a significant and considerable compression force to be exerted by the cargo body to maintain a sealing environment.

SUMMARY OF THE INVENTION

In accordance with one embodiment of the present invention, a sealing structure for a loading dock opening, consisting of two side seals on opposite sides with a sealing form and mounted in a vertical orientation to a frame, and a curtain-like head seal also affixed to the frame, which in turn is affixed to the loading dock walls. Taken together, the sealing structure sealingly engages the cargo body such that weather elements do not enter the warehouse or truck body but goods can be moved between the cargo body and the warehouse. The seal is deformable but resilient, forming a seal when in contact with the truck cargo body, which has shape memory and stiffness to revert to its original form when it no longer contacts the truck cargo body.

In one embodiment of the present invention, side seals are mounted in a vertical orientation on each side of the loading dock entrance, an outer layer forming a sealing shape, typically that of a teardrop, in profile. It may contain one or more reinforcing strips within it, as well as a foam core, both of which help it to maintain its teardrop shape, even after frequent and prolonged contact with a truck cargo body. The side of the side seal opposite the rounded portion of the teardrop comes together, forming a mounting flange, which is mounted by means of bolts to a metal frame, which in turn is mounted to the loading dock wall.

The head seal consists of a curtain-like structure which hangs down from the structural frame, and sealingly engages a truck cargo body when it backs into the sealing structure. It drapes over the rear of the cargo body so as to create an environmental seal between the warehouse and the exterior that is able to accommodate height changes in the truck cargo body due to changing loads.

DETAILED DESCRIPTION OF THE INVENTION

The present invention will now be described more fully hereinafter with reference to the accompanying figures, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
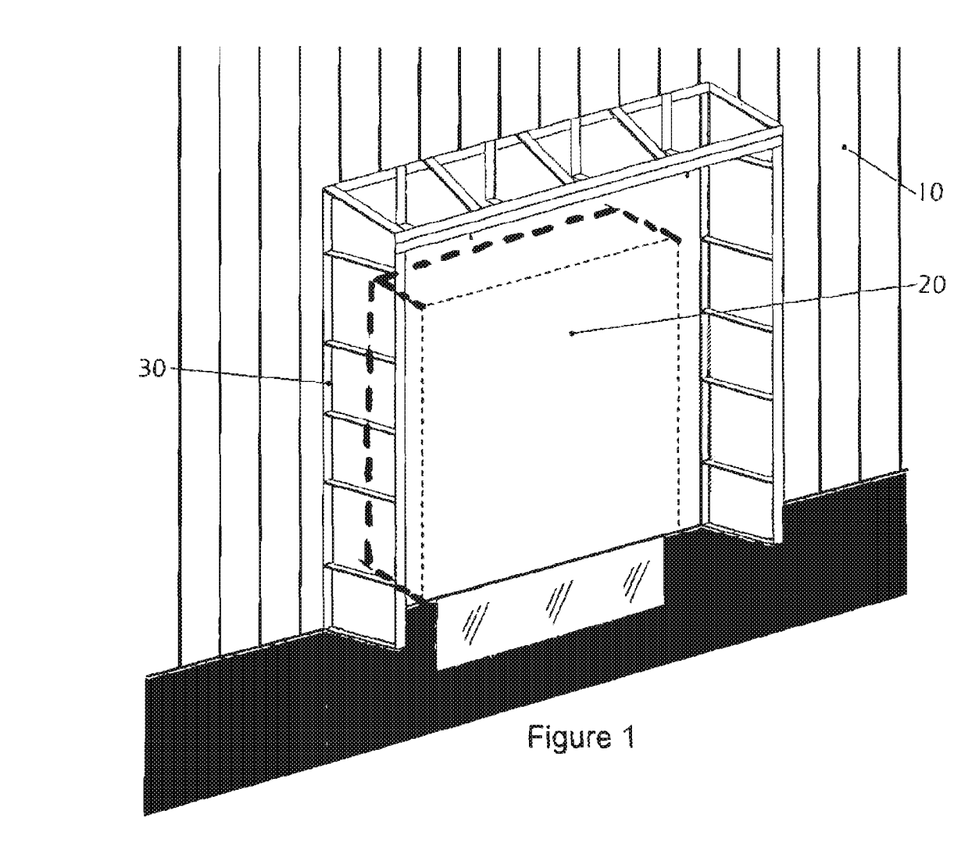
FIG. 1 is a perspective view of the structural frame as required for the present invention affixed to a building having a loading dock, according to one embodiment of the present invention.

With reference to FIG. 1 and according to one embodiment of the present invention, a building having a building wall 10 is shown having an opening in the form of a loading dock opening 20. A structural frame 30 is shown positioned and fixed to the building wall 10 in proximate relationship to the loading dock opening 20. The structural frame 30 is required to secure the other elements of the sealing structure of the present invention. A worker skilled in the relevant art would be familiar with the various types of materials that can be used to fabricate and erect such a structural frame for example, aluminum, steel or any other suitable types of construction materials. The structural frame 30 is secured to the building wall 10 through various securing means as would be known by a worker skilled in the relevant art.

Figure 2:
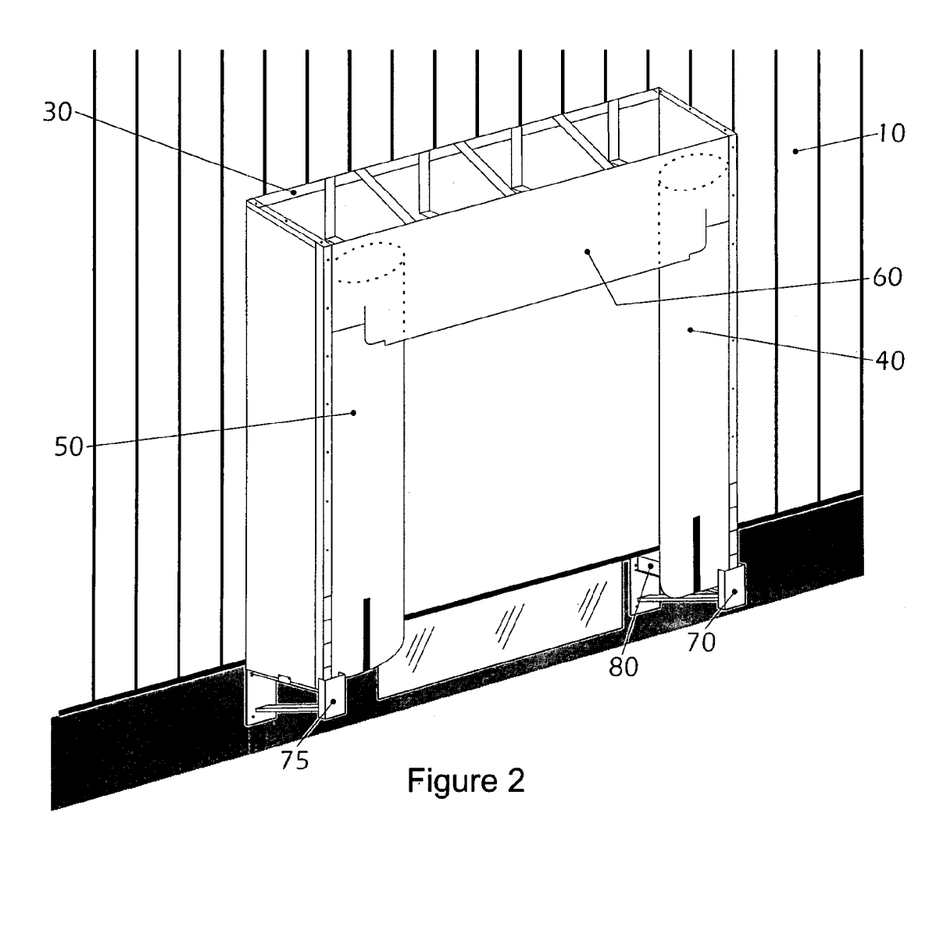
FIG. 2 is a perspective view of the structural frame with flexible seals and head seal attached to the structural frame according to one embodiment of the present invention.

With reference to FIG. 2 and according to one embodiment of the present invention, the structural frame 30 is shown with flexible seals 40 and 50 secured to it. A flexible head seal 60 is also secured to structural frame 30 wherein the top sections of flexible seals 40 and 50 are concealed behind head seal 60 as shown by dotted lines. These three seals combine together to sealingly engage with a cargo body (not shown) to environmentally seal the cargo body (not shown) with the building wall 10. With further reference to FIG. 2, protective guards 70 and 75, which are typical components of a loading dock, are positioned at the bottom of structural frame 30 and flexible seals 40 and 50. A flexible side guard 80 is also shown in FIG. 2 and further described below.

Figure 3A:
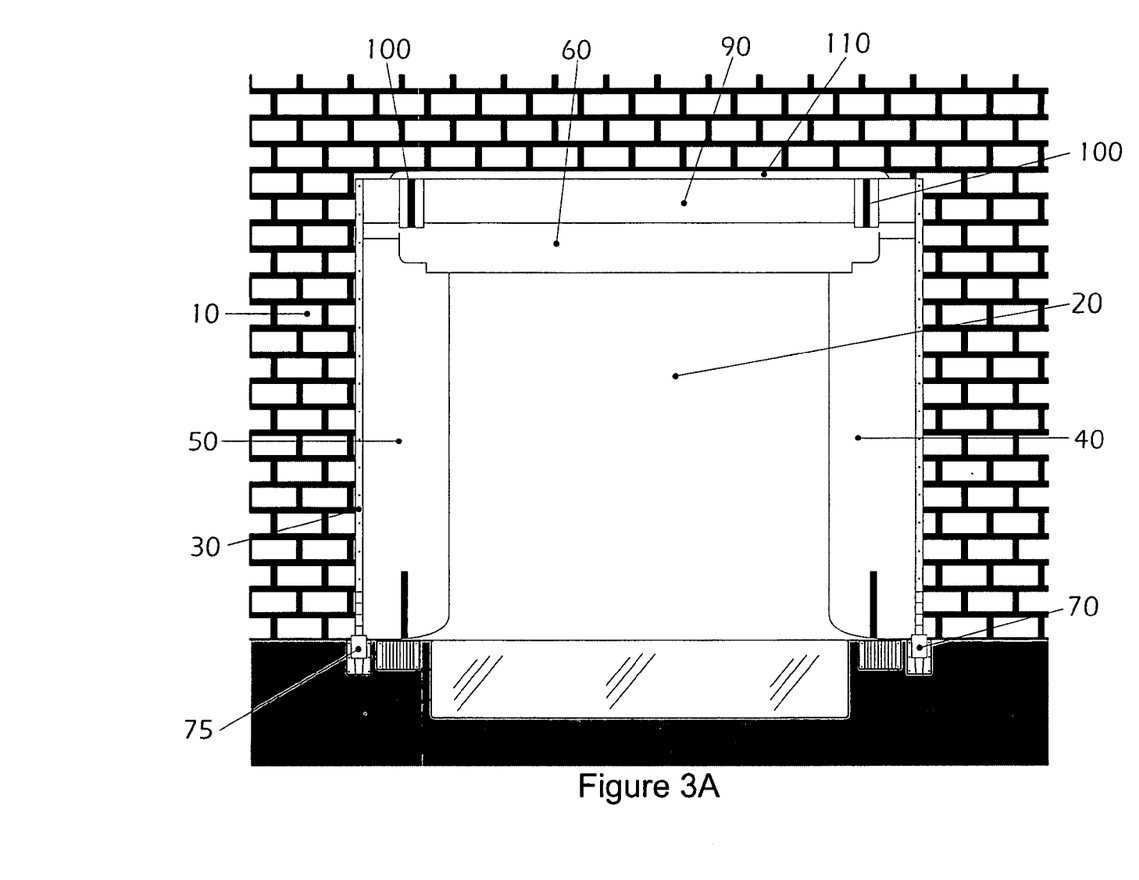
FIG. 3A is a front view of an application of the sealing structure according to one embodiment of the present invention.

With reference to FIG. 3A and according to one embodiment of the present invention, the building wall 10 circumscribes a loading dock opening 20 permitting access from the exterior to the interior of the building. Structural frame 30 is mounted on the building wall 10 with a first and second flexible side seals 40 and 50 mounted on the structural frame 30 opposite one another. A head flexible seal 60 is positioned above the flexible side seals 40 and 50 to seal the top of a cargo body (not shown). The side seals 40 and 50 are mounted so that the projecting rounded sides define a width slightly less than that of a cargo body (not shown).

With further reference to FIG. 3A, a protective cover 90 is positioned above head seal 60 according to one embodiment of the present invention. The protective cover 90 also has visual indicators in the form of reflective stripes 100 for guiding a truck driver during the alignment and centering of a truck's cargo body (not shown) within the loading dock opening 20. When the truck cargo body (not shown) reverses into the side seals 40 and 50, said seals 40 and 50 will be displaced and deform elasticly and resiliently into the loading dock opening 20 as a result of the displacement force exerted by the cargo body (not shown), all the while maintaining contact on the cargo body (not shown) as a result of their elasticity. The side seals 40 and 50 have a sealing form which is a teardrop cross-sectional shape that provides resilient elasticity and durability and is further described below. A person skilled in the art would know that other sealing forms may be used, such as an oval cross-sectional shape, while achieving the intended result. The side seals maintain a small pressure and constant contact in order to bring about a seal between the sides of the cargo body (not shown) and the structural frame 30. The head seal 60 is in the form of a curtain of PVC plastic which hangs down from the top portion of the structural frame 30. When the cargo body (not shown) is positioned within the sealing structure of the present invention, the head seal 60 drapes from the frame 30 over the top rear of the cargo body (not shown), creating an environmental seal. While the side seals 40 and 50 and head seal 60 together form an environmental seal between the truck cargo body and the warehouse located within the loading dock, seals 40, 50 and 60 are not bumpers and do not prevent a cargo body from backing into the dock 20.

With further reference to FIG. 3A, an eavestrough 110 is position on the top surface of the structural frame 30. The presence of eavestrough 110 allows the channeling of water away from the cargo body (not shown) and may dissipate the water along the sides of structural frame 30.

Figure 3B:
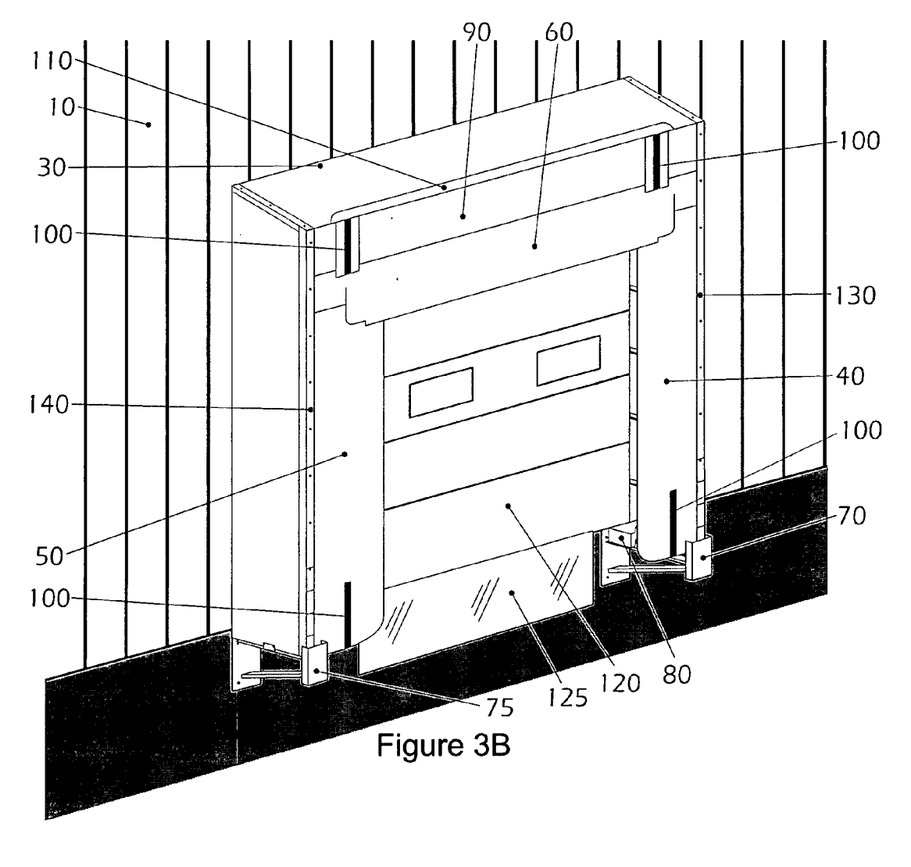
FIG. 3B is a perspective view of an application of the sealing structure according to one embodiment of the present invention.

With reference to FIG. 3B and according to one embodiment of the present invention, flexible side seals 40 and 50 are shown attached to a structural frame 30 proximate to a dock opening having a door 120 and a loading plate 125. The flexible side seals 40 and 50 also operatively contact the flexible side guard 80 when a cargo body (not shown) is positioned within the sealing structure of the present invention. Securing means in the form of aluminum angles 130 and 140 secure the side seals 40 and 50 to structural frame 30. Head seal 60 is secured to structural frame 30 through the use of screws or any other manner as would be known by a worker skilled in the relevant art. The securing means used to secure head seal 60 are positioned underneath protective skirt 90. Protective guards 70 and 75 are also shown at the bottom of structural frame 30. Reflective stripes 100 may also be located on the side seals 40 and 50 and protective skirt 90 to further assist in the alignment and centering of a cargo body (not shown) within the sealing structure of the present invention.

Figure 4:
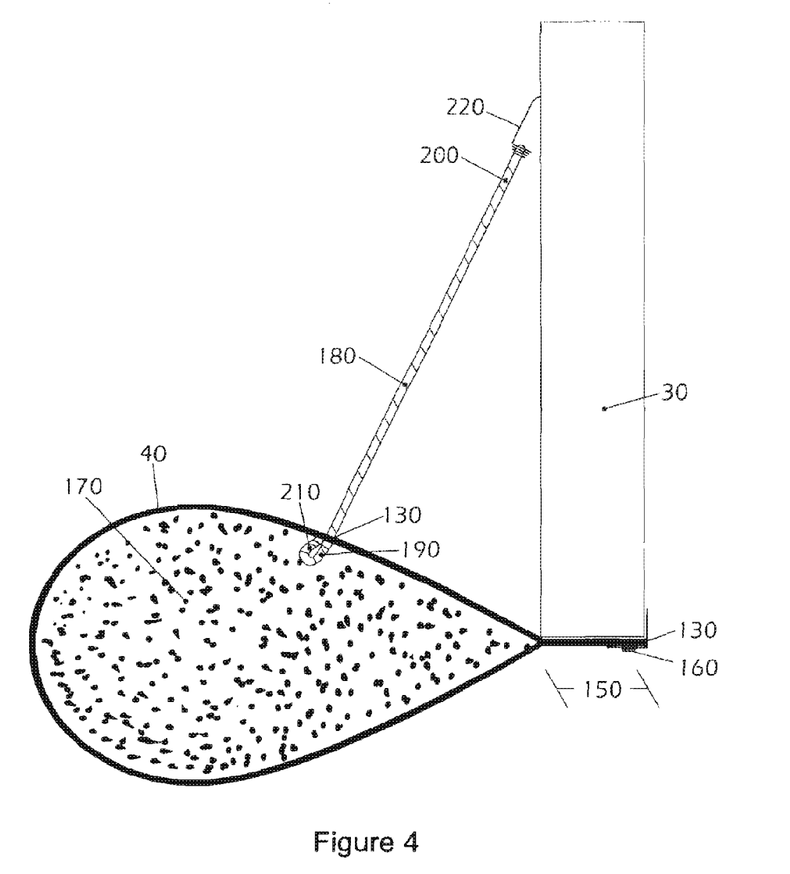
FIG. 4 is a detailed view of a flexible seal showing the components of the seal while being affixed to the structural frame according to one embodiment of the present invention.

With reference to FIG. 4 and according to one embodiment of the present invention, a flexible side seal 40 is secured to a section of structural frame 30. The flexible seal 40 is secured to the structural frame 30 through a flange mounting section 150 of the flexible seal 40. Securing means in the form of an aluminum angle 130 is then positioned over the flange mounting section 150 and structural frame 30 in order to secure the flexible seal 40 to the structural frame 30. A screw 160 is positioned through the aluminum angle 130 in order to secure the flange section 150 of the flexible seal 40 to the frame 30 wherein the screw 160 passes through the flange mounting section 150 of the flexible seal 40. The use of a flange and screw are well known engaging means to secure components to one another. A worker skilled in the relevant art would be familiar with other means such as for example, nuts and bolts, nails or even super glue. A worker skilled in the relevant art would also be familiar with the number and size of screws required to properly secure a flexible seal to a structural frame as shown.

With further reference to FIG. 4, foam material 170 is positioned within the teardrop section of flexible seal 40. As will be described later, the teardrop section of the flexible seal 40 can be entirely filled with pre-shaped teardrop foam or may have a number of foam sections within the length of flexible seal 40.

With further reference to FIG. 4, retaining means 180 is shown having a first end 190 affixed to the flexible seal 40 and an opposite end 200 affixed to structural frame 30. The retaining means 180 may be constructed of cloth-covered rubber cord, also known as "bungee cord", or may be manufactured of a variety of other materials while achieving the same result as would be appreciated by a worker skilled in the relevant art. The retaining means as shown in FIG. 4 is a bungee cord in an extended position which allows for the flexible seal 40 to be in a rest position. The presence of the retaining means 180 prevents the flexible seal 40 from further extending away from the structural frame 30 while in a rest position. Without the presence of this retaining means 180, flexible seal 40 could extend away from the structural frame 30 which would negatively impact the functionality of the flexible seals of the present invention in operation.

With further reference to FIG. 4, the retaining means 180 is fastened to the flexible side seal 40 by first having a knot 210 at bungee cord end 190. The knot 210 is sufficiently large to prevent the knotted end 210 from being pulled through opening 130 in side seal 40. Opposite end 200 is fastened to the frame 30 by a hook 220. A person skilled in the art would be familiar with various fastening means that may be employed to fasten the bungee cord 180 between the side seal 40 and the structural frame 30 to achieve the intended result. A worker skilled in the relevant art would also be familiar with the material selected to manufacture the flexible side seals to ensure adequate rigidity sufficient to secure retaining means to the side seal and the structural frame.

Figure 5:
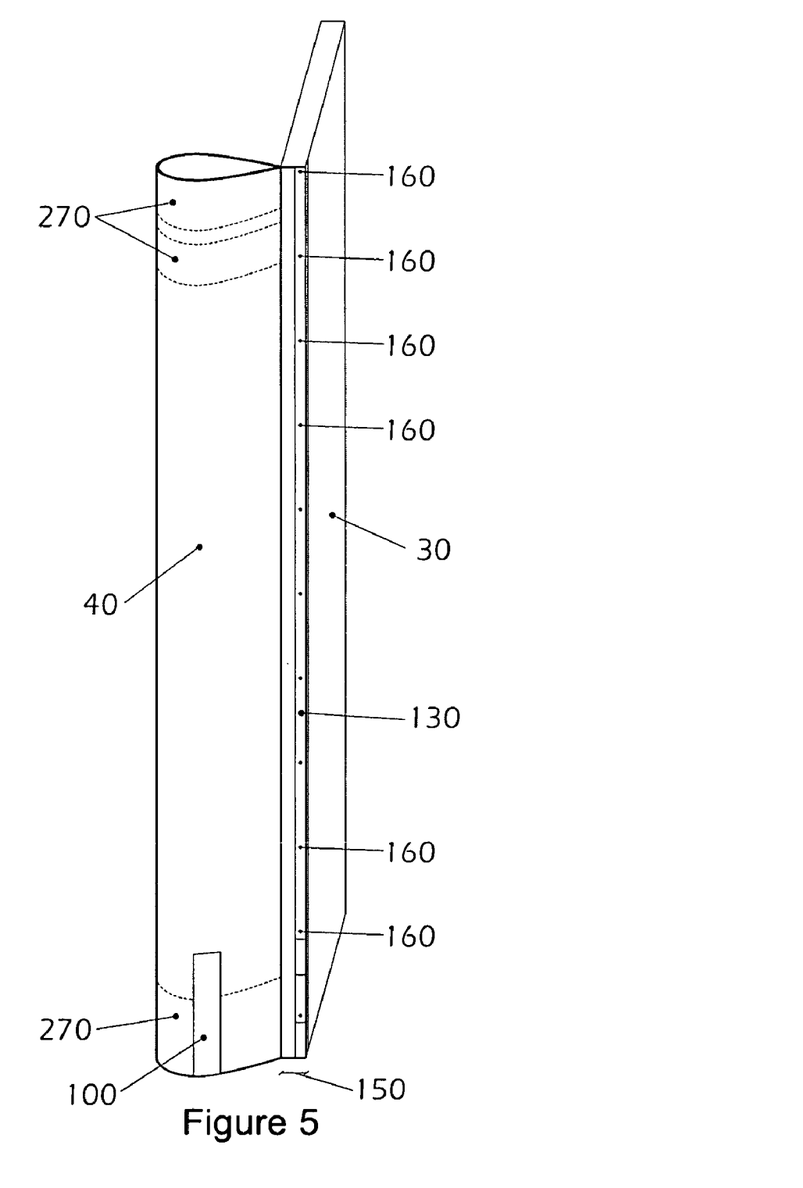
FIG. 5 is a perspective view of a flexible seal of the present invention secured to the structural frame and according to one embodiment of the present invention.

With reference to FIG. 5, and according to one embodiment of the present invention, a flexible seal 40 of the present invention is shown affixed to a structural frame 30 wherien the entire structural frame is not shown as in FIG. 1. The flange mounting section 150 of the flexible seal 40 is secured to structural frame 30. The securing means utilized to secure the flange mounting section 150 to the structural frame 30 are similar as described under FIG. 4 and consist of an aluminum angle 130 secured with screws 160.

With further reference to FIG. 5, visual indicators in the form of a reflective stripe 100 may be present on the lower portion of flexible side seal 40, or may extend the length of the flexible side seal 40, and is generally located in the center of the front of the flexible side seal 40, such that it may aid drivers in positioning truck cargo bodies, who see the reflective stripes 100 in their side-view mirror. In one embodiment of the present invention, the flexible side seal 40 is reinforced by one or more sections of a second reinforcing layer 270 as shown by the dotted lines. The reinforcing layers 270 aid in maintaining the flexible side seal 40 in a teardrop shape and provides added rigidity and durability. In a preferred embodiment, the reinforcing layer 270 is present in the entire length of side seal 40. In another embodiment, the reinforcing layers 270 are only present at the top and the bottom of side seal 40 as shown in FIG. 5 in order to increase the rigidity of the impact areas on flexible seal 40 as exerted by the top and bottom of a cargo body (not shown). A person skilled in the art would appreciate that there may be one or more sections of reinforcing layers 270 spaced along the length of the interior of the side seal 40, any configuration achieving the intended result. In another embodiment of the present invention, reinforcing layers may be absent in order to manufacture a less expensive flexible side seal. A more detailed description of the flexible seal 40 is provided below.

Figure 6:
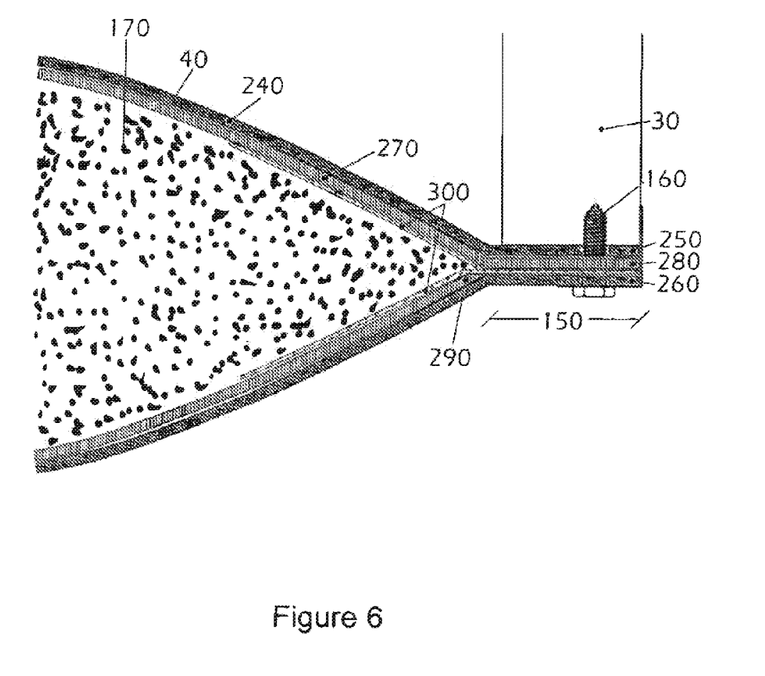
FIG. 6 is a detailed top view of a flexible seal secured to the structural frame according to one embodiment of the present invention.

With reference to FIG. 6 and according to one embodiment of the present invention, a detailed view of a flexible seal 40 is shown as secured to structural frame 30. The flexible seal 40 is constructed of a resilient, sheet-like cover layer 240 having a first edge 250 and a second edge 260. The cover layer is made from a heavy-duty PVC plastic or any other suitable material as would be known by a worker skilled in the relevant art and suitable for various climatic conditions. The first edge 250 and second edge 260 are positioned atop one another to create a flange mounting section 150 on the flexible seal 40. The presence of flange mounting section 150 allows for the flexible seal 40 to be secured to structural frame 30.

With further reference to FIG. 6, a reinforcing layer 270, in one embodiment also made from heavy-duty PVC plastic, lies within, and follows the tear-drop shape of, the cover layer 240. The reinforcing layer 270 also has a first reinforcing layer edge 280 and a second reinforcing layer edge 290. The first reinforcing layer edge 280 coincides with the first edge 250 of the cover layer 240, and lies within the mounting flange section 150. The second reinforcing layer edge 290 does not extend into the mounting flange section 150. The interior of flexible seal 40 is filled with a shaped foam insert 170 as previously described, which helps to maintain the shape of the seal despite frequent, extended contact with a cargo body (not shown), during its operational life. A pull strip 300 is affixed to either side of the shaped foam insert 170, such that it overlaps at the narrow end of the tear-drop shape. A worker skilled in the relevant art would be familiar with the various lengths and types of pull strip material required to ensure a stable and durable structure. The pull-strip 300 during assembly of the flexible seal 40 is positioned between edges 280 and 260 and within the mounting flange section 150. The presence of pull strip 300 also allows for the positioning of the foam insert 170 within the flexible seal 40 as separate sections of foam could be inserted within the flexible seal 40 or an entire section of foam could be inserted as shown. A worker skilled in the relevant art would be familiar with the various aspects of foam insert possible within the flexible seals. The mounting flange section 150 is then affixed to the structural frame 30 by an aluminum angle 130 and a series of bolts 160 (only one shown).

Figure 7A:
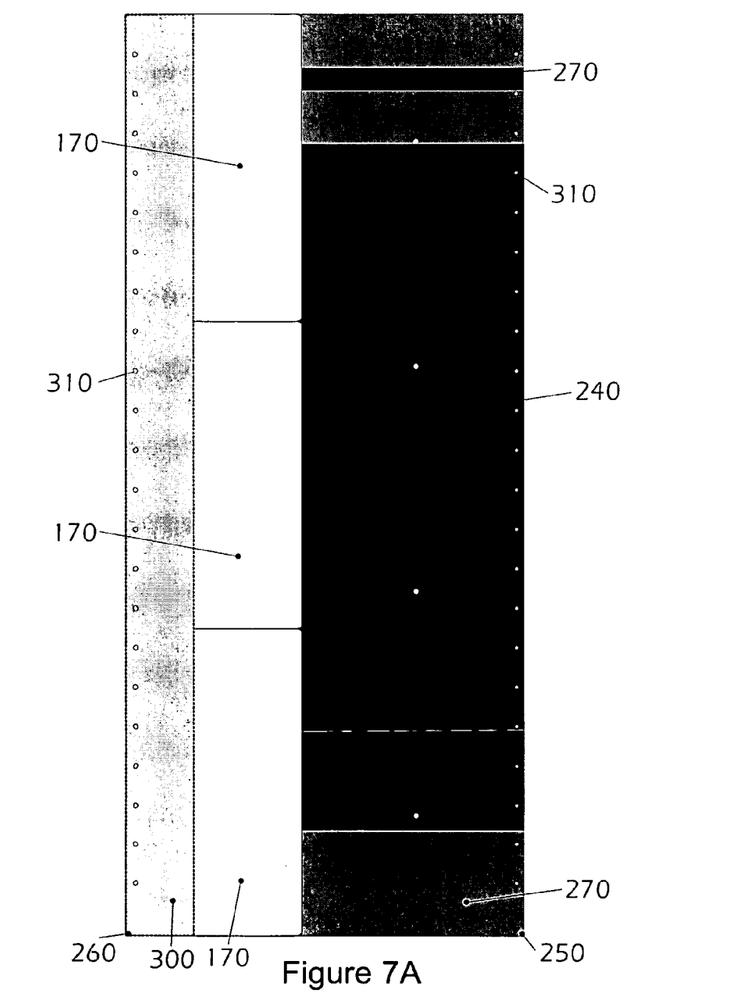
FIG. 7A is a top view of a flexible seal in a semi-disassembled state according to one embodiment of the present invention.

With reference to FIG. 7A and according to one embodiment of the present invention, a flexible seal is shown in a semi-disassembled state. The cover layer 240 is positioned flat on a surface and presents an elongated rectangle with edges 250 and 260. Reinforcing layers 270 are placed selectively on the cover layer 240, and may consist of two strips only at the top and bottom, or may consist of one strip only in the middle, or may consist of various strips strategically placed along the length of the cover layer 240, or may consist of a single layer which coincides with the entire length of cover layer 240, such that it is, in effect, a double-layer cover layer as previously described. The pre-shaped teardrop foam insert 170 is formed of three foam blocks in the present embodiment. A pull-strip 300, which is glued onto the pre-shaped foam inserts 170 at the small end of the its teardrop profile and further described in FIG. 7B is secured to the cover layer 240.

With further reference to FIG. 7A, a first series of openings 310 along edge 250 and a second series of opening 310 along edge 260 provide means to secure the flexible seal to the frame structure for example through the use of bolts or screws and an aluminum angle (all not shown). During manufacturing, edges 250 and 260 are aligned and positioned atop one another thus aligning the series of openings 310 from both edges 250 and 260 to perfectly coincide with one another. During this step, the entire cover layer 240 is bent in half along its longer axis such that the series of openings 310 from each edge 250 and 260 coincide, and in this manner a side seal 40 employing a tear-drop cross-sectional profile is assembled. A person skilled in the art would appreciate that different methods of assembly could be employed to produce side seals with different cross-sectional profile shapes.

Figure 7B:
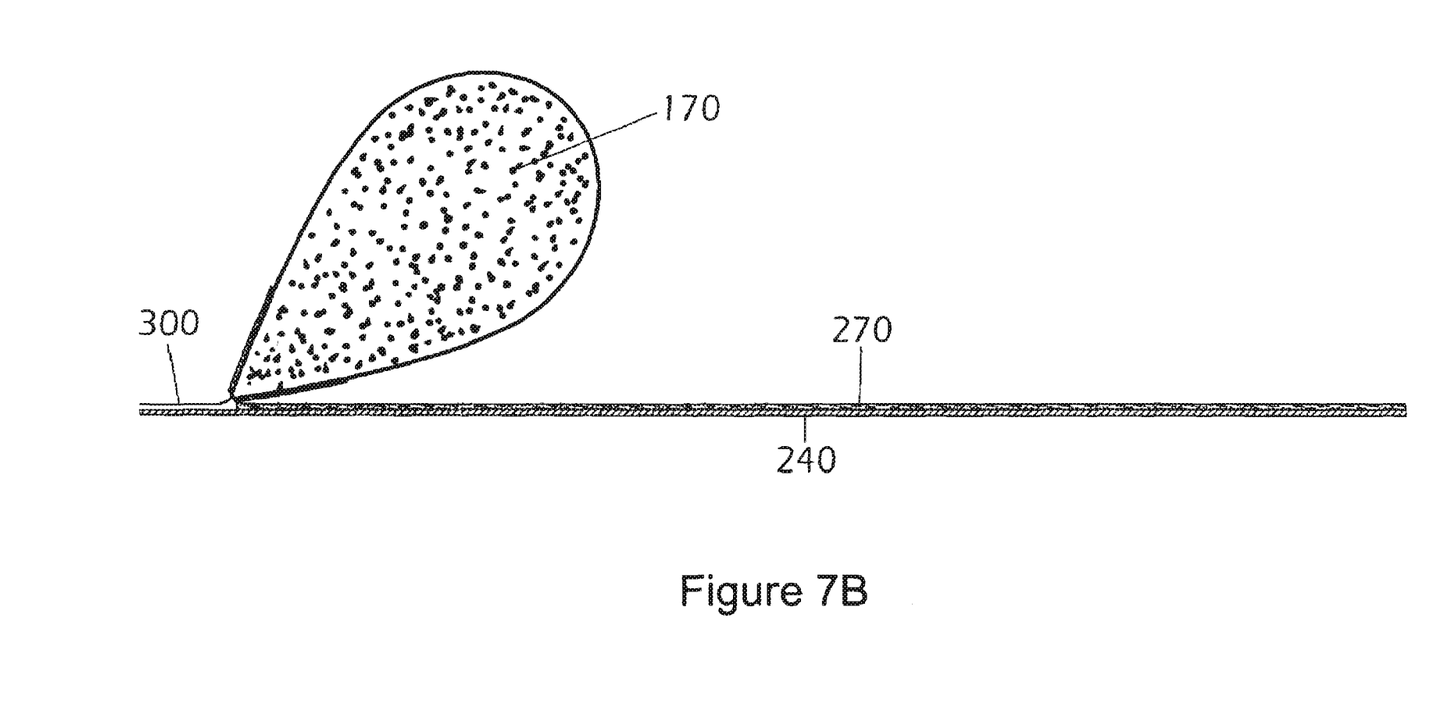
FIG. 7B is a side view of a side seal in a semi-disassembled state according to one embodiment of the present invention.

With reference to FIG. 7B, the foam insert 170 is secured to the cover layer 240 through the pull strip 300 which is secured to the cover layer through the use of a super adhesive material such as glue or such as would be known by a worker skilled in the relevant art. The pull strip 300 extends on each side of the foam insert 170 to further secure the foam in place within the flexible seal. The reinforcing layer 270 extends only up to the foam insert 170 and does not extend the entire length of the cover layer 240.

With further reference to FIG. 7B, the foam insert 170 lies on top of the reinforcing layer 270 and the cover layer 240. On each side of the narrow end of the pre-shaped foam's 170 tear-drop shape is glued the pull strip 300, which overlaps the narrow end of the pre-shaped foam insert 170 such that the end of the pull strip 300 coincides with the side of the cover layer 240 and reinforcing layer 270.

Figure 8:
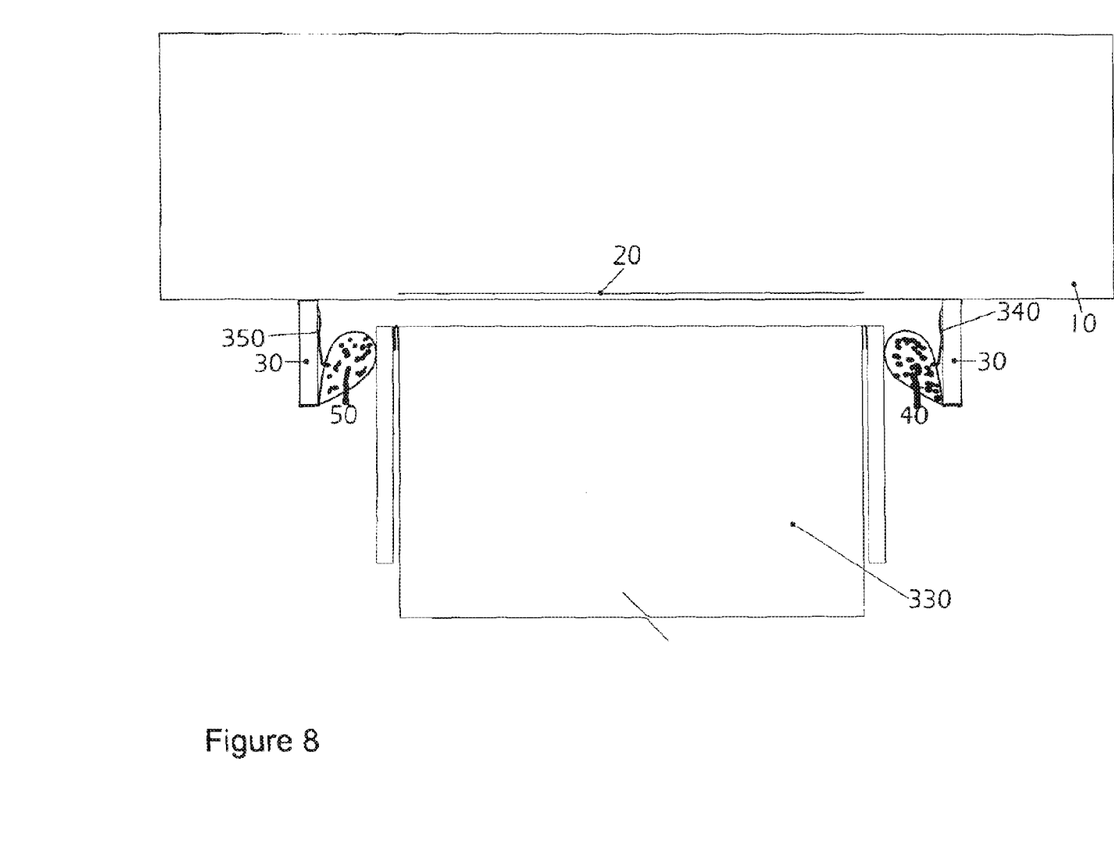
FIG. 8 is a top view of an application of the present invention affixed to a building having a loading dock absent the head seal according to one embodiment of the present invention.

With reference to FIG. 8 and according to one embodiment of the present invention, various components of the sealing structure of the present invention are shown. Flexible seals 40 and 50 are shown and affixed to the structural frame 30. A cargo trailer 330 is positioned between both flexible seals 40 and 50. The flexible side seals 40 and 50 are compressed due to the advent of the cargo trailer 330 applying a displacement force and some pressure to the front of the flexible side seals 40 and 50. Means to retain in the form of retaining cords 340 and 350 appear in a relaxed position as the flexible side seals 40 and 50 are displaced and deformed in a direction towards the interior of the loading dock opening 20. The elasticity of the flexible side seals 40 and 50 hold it against the cargo body 330, so that it is able to form a seal between the cargo body 330 and the frame 30 and, consequently, the building wall 10. When in a sealed, or compressed, position, the retaining cords 340 and 350 are in a relaxed or slack position since the unextended cords are now longer than the distance between the points of fastening of the retention cords 340 and 350 in the flexible side seals 40 and 50, and the frame 30.

Figure 9:
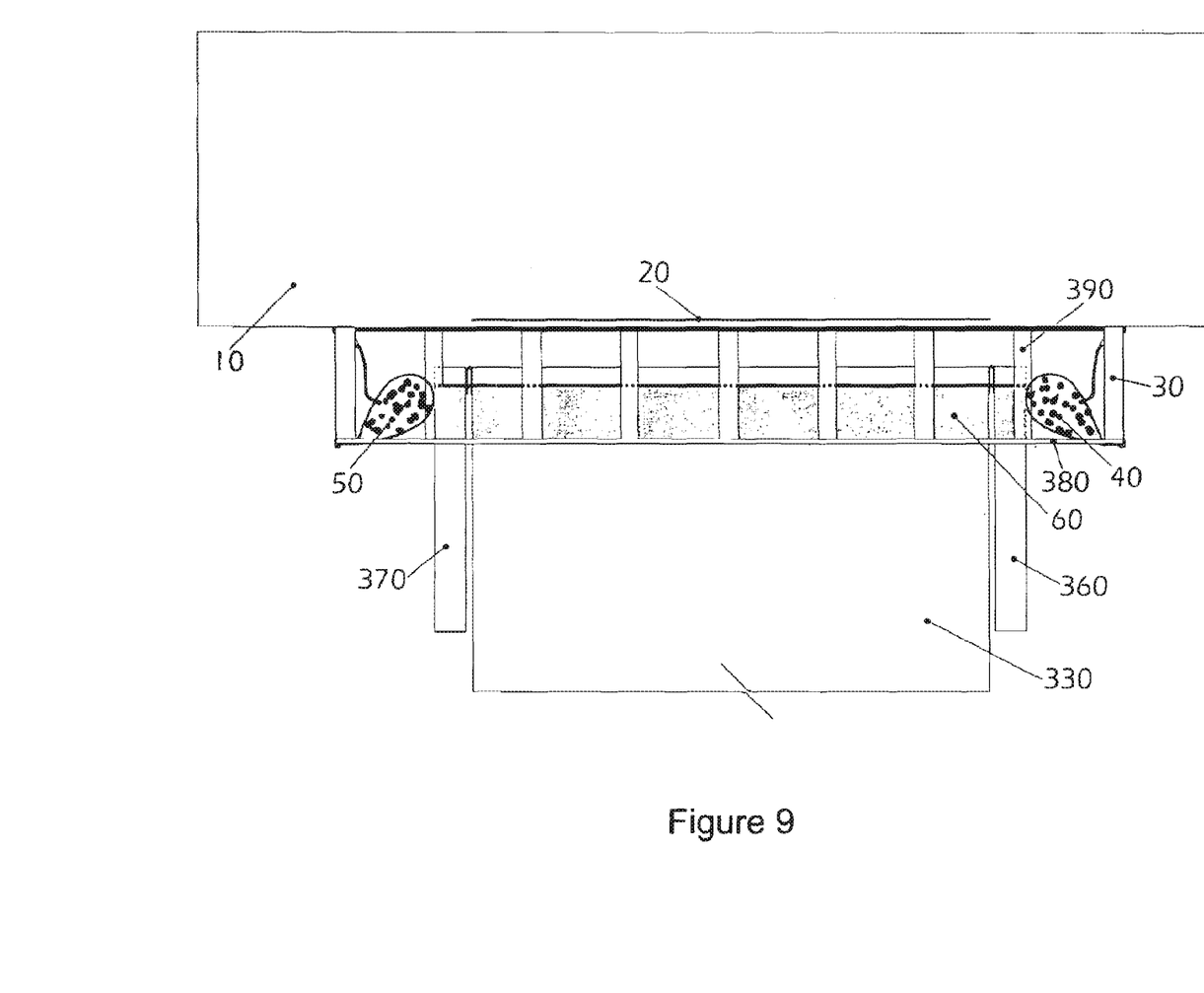
FIG. 9 is a top view of an application of the present invention affixed to a building having a loading dock according to one embodiment of the present invention.

With reference to FIG. 9 and according to one embodiment of the present invention, a cargo body 330 having its rear doors 360 and 370 in an open condition and positioned along the sides of the cargo body 330 is positioned within the sealing structure such that the side seals 40 and 50 are in a sealed position. The frame is composed of a front plate 380 and several galvanized steel struts 390 that are affixed to the building wall 10. The frame is sealed by a protective layer (not shown) of PVC plastic which lies on top of struts 390 and is affixed to both the front plate 380 and the building wall 10, environmentally sealing the interior of the building from the exterior. The head seal 60 hangs from the front plate 380 and rest on the top surface of the cargo body 330.

Figure 10:
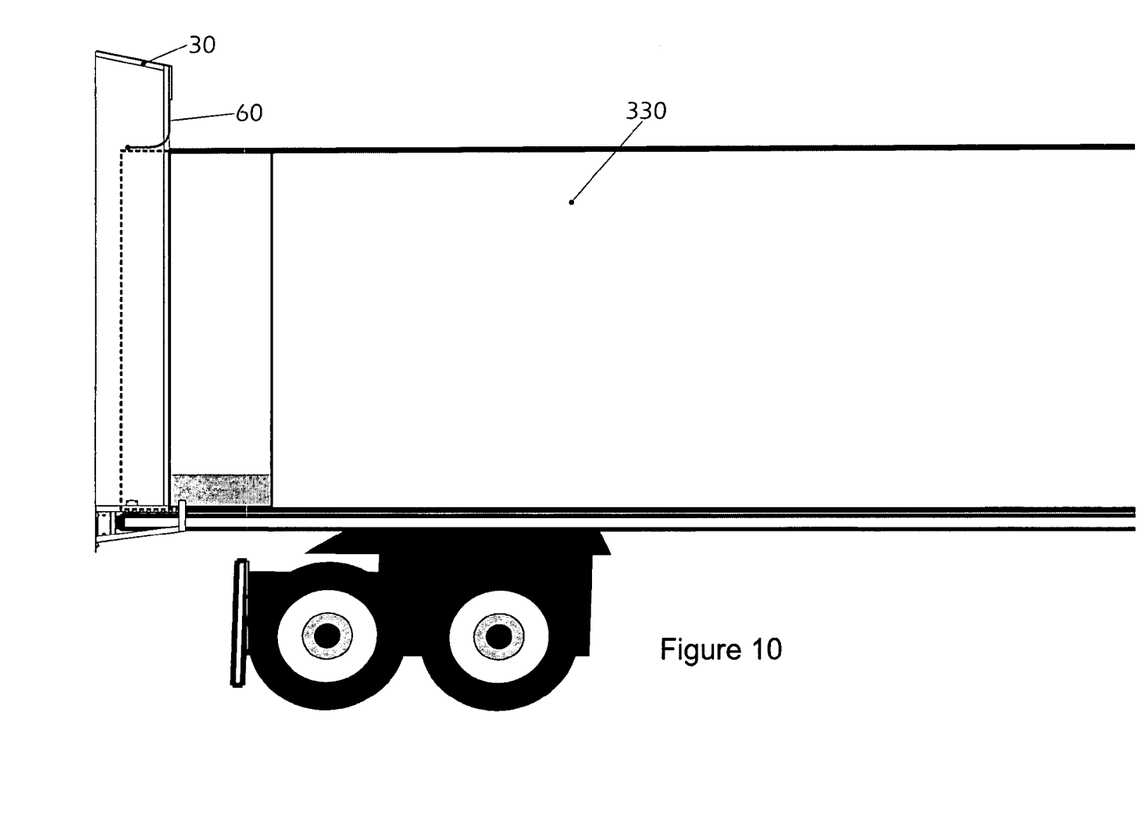
FIG. 10 is a side view of an application of the present invention affixed to a building having a loading dock with a truck cargo body docked to it according to one embodiment of the present invention.

With reference to FIG. 10 and according to one embodiment of the present invention, the head seal 60 is moved in a sealing position when the cargo body 330 is docked. The length of the head seal 60 hangs down which allows it to drape over the top surface of the cargo body 330 forming an environmental seal between the warehouse and the exterior. As the length of the head seal 60 is longer than the distance between the front plate and the truck cargo body 330, the head seal 60 is able to accommodate a variety of truck cargo body heights. The head seal's flexibility inherent in its curtain-like structure allows the environmental seal to be maintained in the face of height changes in the truck cargo body that progressively occur as the load changes with unloading or loading. A worker skilled in the relevant art would also be familiar with the use of precise slits positioned with head seal 60 to allow greater flexibility and applicability of head seal 60 in order to minimize tearing of the head seal. The presence of such slits in head seal 60 are shown in FIG. 1.

Figure 11:
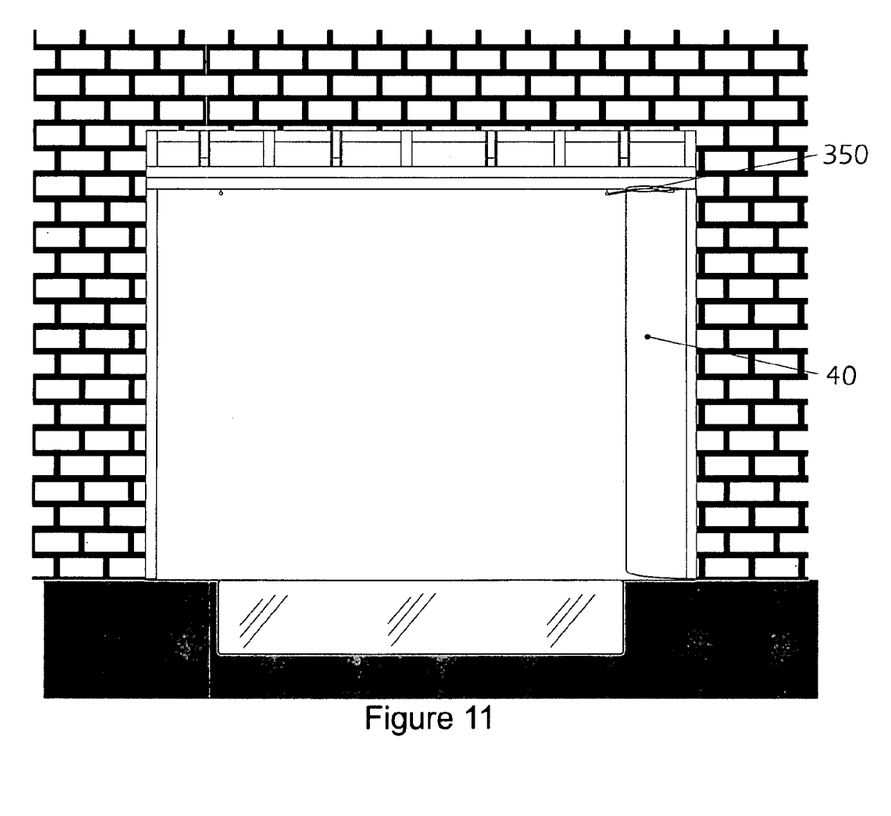
FIG. 11 is a front view according to one embodiment of the present invention wherein frontal means to retain is positioned on a flexible seal according to one embodiment of the present invention.

With reference to FIG. 11 and according to one embodiment of the present invention, a frontal means to retain 350 may be position on the front portion of a flexible side seal 40. The presence of frontal means to retain may facilitate the return of the flexible seal 40 in a rest position once a cargo body is displaced from the sealing structure of the present invention. A worker skilled in the relevant art would be familiar with various manners available to provide this additional means to retain such as a bungee cord or a spring like mechanism as shown in FIG. 11.

Figure 12:
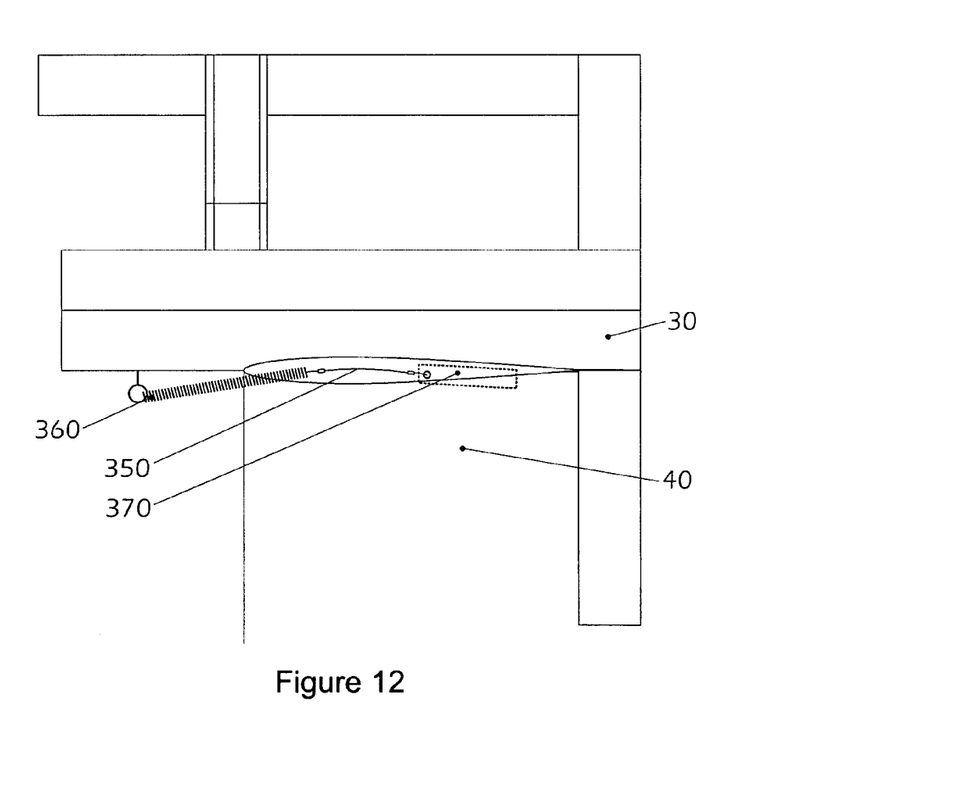
FIG. 12 is a detailed view of frontal means to retain as shown in FIG. 11 according to one embodiment of the invention.

With reference to FIG. 12, the frontal means to retain 350 as described in FIG. 11 is shown with a first end 360 of means to retain 350 attached to structural frame 30 and opposite end 370 of means to retain 350 attached to the side seal 40. A worker skilled in the relevant art would be familiar with various means available to secure either ends 360 and 370 to either the structural frame 30 or side seal 40 such as a hook, screws, super adhesive glues or even a knot based on the nature of the means to retain means used as defined previously.

Many modifications and other embodiments of the invention will come to the mind of one skilled in the art having the benefit of the teachings presented in the foregoing description and associated drawings. Therefore, it is understood that the invention is not to be limited to the specific embodiment disclosed, and that modifications and embodiments are intended to be included within the scope of the appended claims.

The embodiments of the invention in which an exclusive property or privilege is claimed are defined as follows:

1. A sealing structure for environmentally sealing a cargo body within a loading dock, the structure comprising:
   a) a structural frame positioned and secured in close proximity to the door or like opening;
   b) a first flexible seal for sealing a cargo body, the seal having a teardrop-shaped cross-section and having a reinforced mounting flange section, the seal positioned on and secured to the structural frame by means of the mounting flange section;
   c) a second flexible seal for sealing a cargo body, the seal having a teardrop-shaped cross-section and having a reinforced mounting flange section, the seal positioned on and secured to the structural frame opposite the first flexible seal by means of the mounting flange section;
   d) a curtain-like flexible head seal positioned on and secured to the structural frame, adapted to drape over and form a seal with the top of the cargo body;
   e) means to retain said first and second flexible seals in a rest position extending inwardly towards the frame; and
   wherein the flexible head seal is positioned atop the first and second flexible seals, and the width between first and second flexible seals is less than a cargo body, and each of the flexible seals contain one or more shaped foam inserts.

2. The sealing structure of claim 1 wherein the door or like opening is a loading dock door.

3. The sealing structure of claim 1 wherein the structural frame is made of galvanized steel.

4. The sealing structure of claim 1 wherein securing means are used to secure the first and second flexible seal to the structural frame.

5. The sealing structure of claim 4 wherein the securing means are aluminum angles.

6. The sealing structure of claim 1 wherein the flexible head seal is in a curtain-like form.

7. The sealing structure of claim 1 wherein the means to retain the first and second flexible seals consists of rubber cord.

8. The sealing structure of claim 1 wherein the means to retain the first and second flexible seals consists of nylon cord.

9. The sealing structure of claim 1 wherein the flexible seals have one or more reinforcing strips.

10. The sealing structure of claim 1 wherein frontal means to retain are secured to first and second flexible seals.

\* \* \* \* \*